Figure 1A:
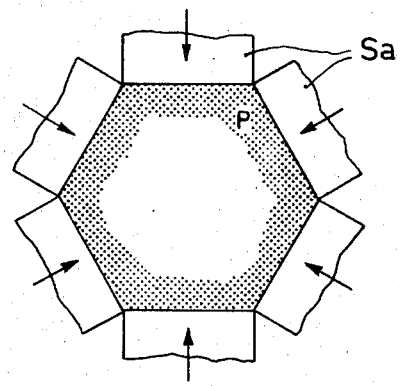

United States Patent [19]

Beasley et al.

[11] 3,859,071

[45] Jan. 7, 1975

[54] APPARATUS FOR COMPRESSING A POLYGONAL PACK OF OPTICAL FIBERS EMPLOYING A PLURALITY OF SLIDES WITH CURVED FACES AND A CAGE

[75] Inventors: Robert Malcolm Beasley, Turners Hill; David John Harman, Hailsham; Douglas Raymond Mainard, Salfords; Derek Washington, Earlswood, all of England

[73] Assignee: U.S. Philips Corporation, New York, N.Y.

[22] Filed: Nov. 19, 1973

[21] Appl. No.: 416,991

Related U.S. Application Data

[62] Division of Ser. No. 197,842, Nov. 11, 1971, abandoned.

[30] Foreign Application Priority Data

Nov. 26, 1970  Great Britain.................... 56234/70

[52] U.S. Cl............................ 65/11 R, 65/4, 65/12, 65/DIG. 7
[51] Int. Cl............................................ C03b 37/00
[58] Field of Search.............. 65/DIG. 7, 11 R, 4, 12

[56] References Cited
UNITED STATES PATENTS

| | | | |
|---|---|---|---|
| 2,992,586 | 7/1961 | Upton | 65/DIG. 7 |
| 3,567,549 | 3/1971 | Hoffmeister et al. | DIG. 7/ |
| 3,626,040 | 12/1971 | Nagao et al. | 65/DIG. 7 |

*Primary Examiner*—Robert L. Lindsay, Jr.
*Assistant Examiner*—Frank W. Miga
*Attorney, Agent, or Firm*—Frank R. Trifari; Carl P. Steinhauser

[57] ABSTRACT

In the manufacture of large-diameter (e.g., 124 mm or over) channel and fibre-optic plates a polygonal pack of fibres is compressed and fused in an oven by curved convex rams so that the resulting compressed pack has concave sides of substantially the same length as its initial straight sides.

Most of the distortion of the fibre array occurs at the corners and the distorted corner areas can be removed so as to leave a circular plate of good quality.

5 Claims, 13 Drawing Figures

APPARATUS FOR COMPRESSING A POLYGONAL PACK OF OPTICAL FIBERS EMPLOYING A PLURALITY OF SLIDES WITH CURVED FACES AND A CAGE

This application is a division of application Ser. No. 197,842, filed Nov. 11, 1971, now abandoned.

This invention relates to the manufacture of bodies composed of parallel fibres.

The invention relates more particularly to apparatus and processes for carrying out such manufacture, and it is applicable particularly, though not exclusively, to the manufacture of bodies required for optical or electronoptical imaging purposes. For example, the invention is applicable to the manufacture of some types of fibre-optic plates but the more important application of the invention lies in the field of channel plates and for this reason the following description will be given mainly in terms of such plates.

Channel plates are secondary-emissive electron-multiplier devices comprising a matrix in the form of a plate having a large number of elongate channels passing through its thickness, said plate having a first conductive layer on its input face and a separate second conductive layer on its output face to act respectively as input and output electrodes.

Secondary-emissive intensifier devices of this character are described, for example, in British Patent Specifications No. 1,064,073, No. 1,064,074, No. 1,064,076, No. 1,090,406 and No. 1,154,515, while methods of manufacture are described in British Patent Specifications No. 1,064,072 and No. 1,064,075.

In the operation of all these intensifier devices (when incorporated in electronic imaging tubes) a potential difference is applied between the two electrode layers of the matrix so as to set up an electric field to accelerate the electrons, which field establishes a potential gradient created by current flowing through resistive surfaces formed inside the channels or (if such channel surfaces are absent) through the bulk material of the matrix. Secondary-emissive multiplication takes place in the channels and the output electrons may be acted upon by a further accelerating field which may be set up between the output electrode and a suitable target, for example a luminescent display screen.

According to one method of manufacture which is used at present the matrix of a channel plate is made from a large number of parallel glass tubes having soluble or etchable cores, and said cores may either fill the tubes completely or may be in the form of inner tubes of sufficient thickness and/or hardness to prevent undue distortion of the outer tubes when the latter are fused together under pressure and heat. In this method, fine glass fibre is made by drawing out a rod of soluble core glass that is clad with a tube of multiplier glass. Lengths of fibre are then fused together to form a rigid bundle from which channel plates may be sliced. To ease assembly of large numbers of small fibres, a two-draw technique can be used: Fibres of the intermediate size — from the first draw — are arranged in a polygonal (e.g., hexagonal) mould and are lightly fused together to form a bundle. Hexagonal multifibre is drawn from this bundle, and short lengths are assembled and fused together under pressure to form the final bundle.

Polished slices of the final bundle then have their soluble cores removed leaving the honeycomb or matrix of multiplier glass.

There are difficulties in applying this process to large-diameter plates, e.g., channel plates of 124 mm. diameter and over.

For producing circular plates, a circular jig is the most economical in shape, but would be difficult to pack because a straight side has been found necessary in order to commence the packing. Thus a polygonal shape is best for completion of the packing with optimum accuracy and uniformity.

Figure 3A:
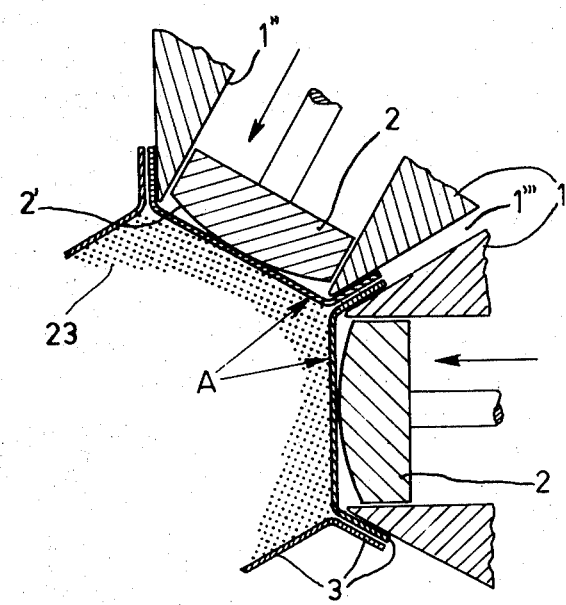
Figure 4:
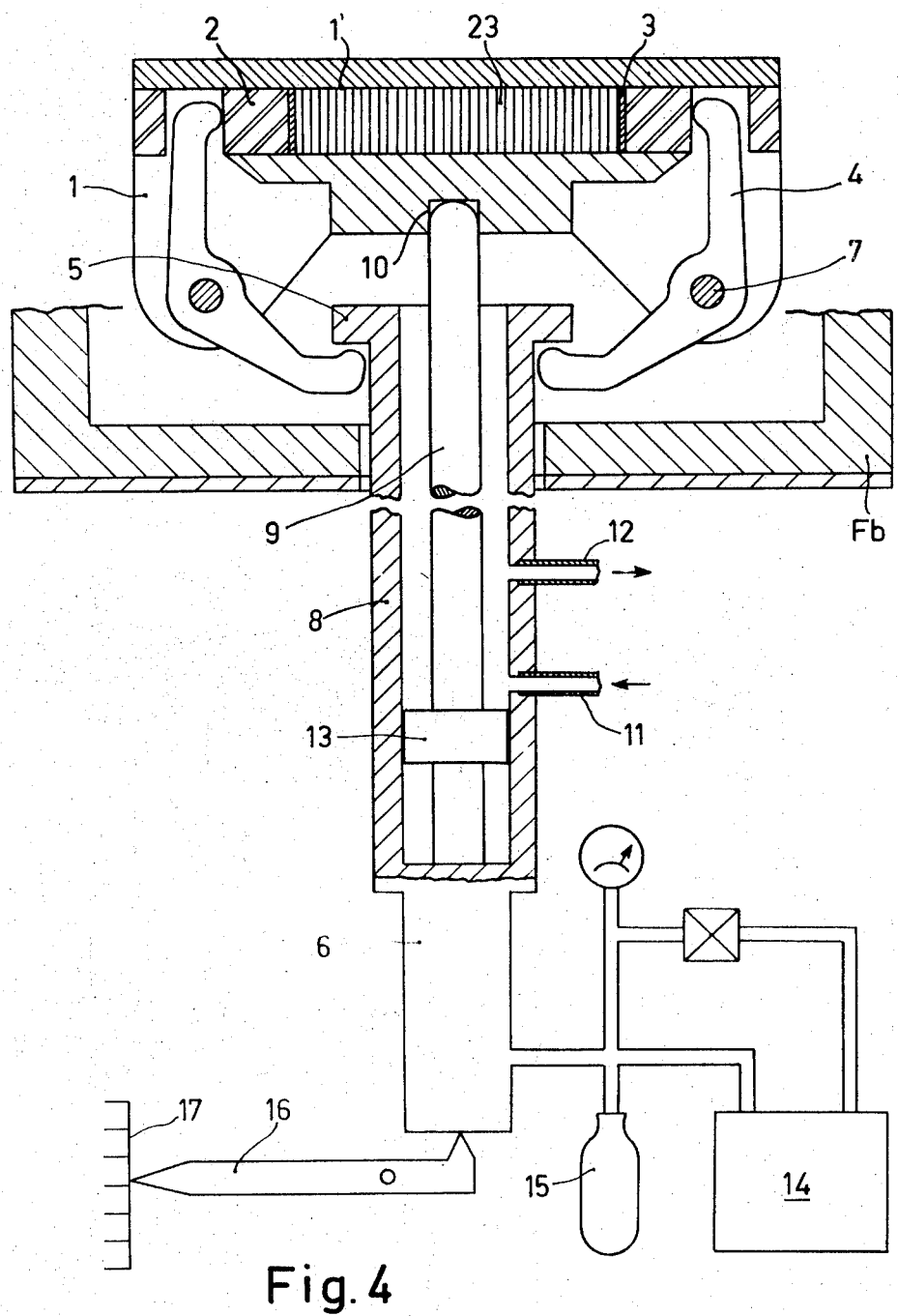
Figure 5:
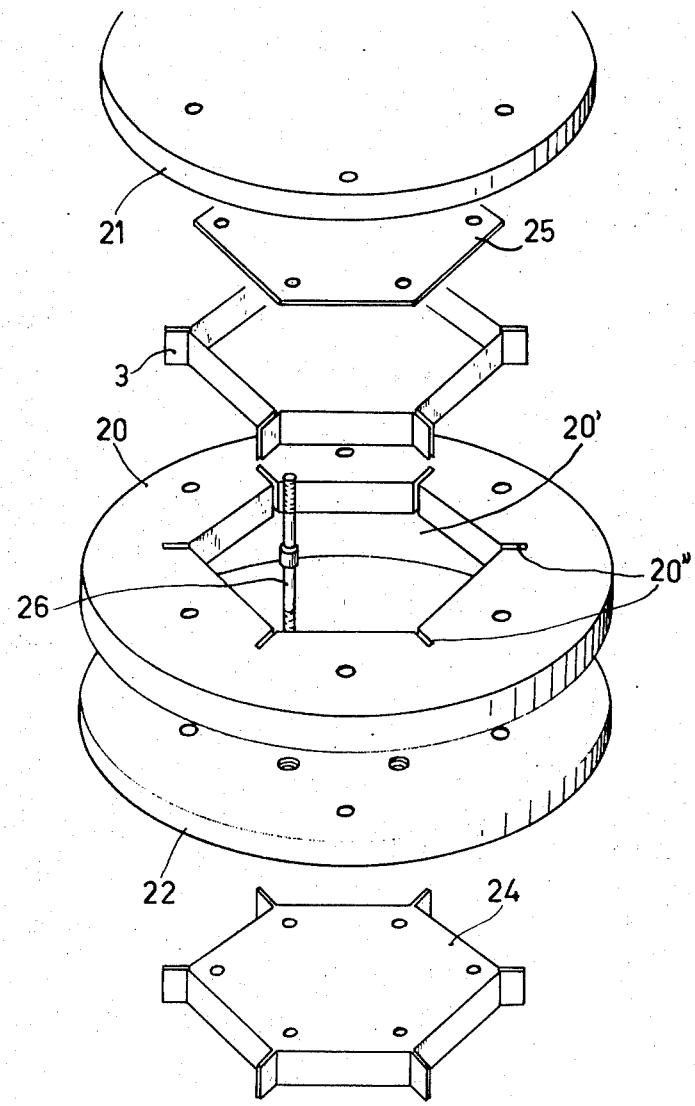
Figure 6:
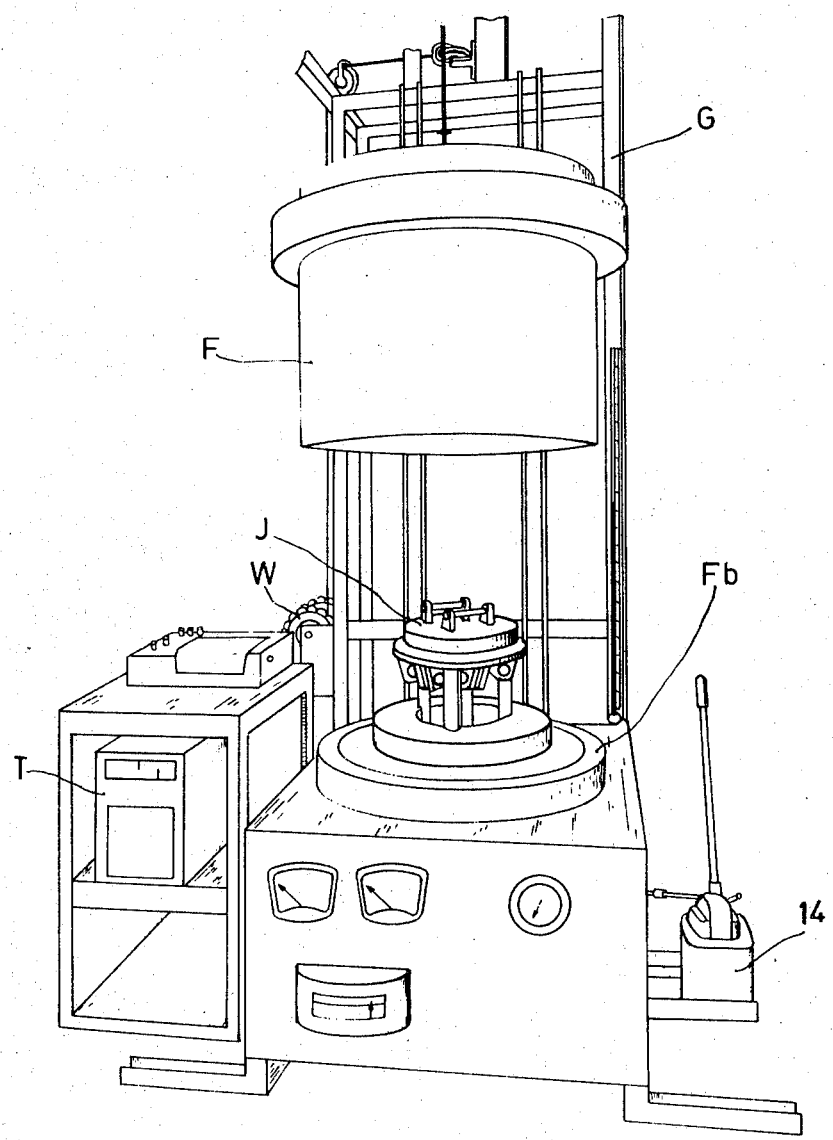
Figure 7A:
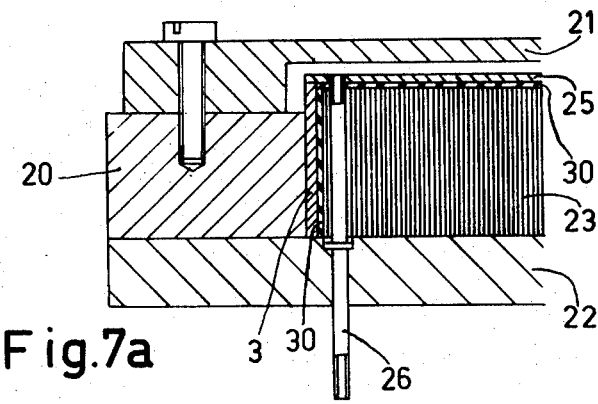

In the drawing:

FIGS. 1a, b and c, and 2a and b show plan views, in section, of a jig for compressing glass fibers FIG. 3a and b show plan views, partially in section, of a jig according to the invention for compressing glass fibers FIG. 4 shows, in section, a compression jig according to the invention FIG. 5 shows an exploded view of a loading jig according to the invention FIG. 6 shows a machine for fusing compressed glass fibers according to the invention; and FIGS. 7a, b and c show the loading jig of FIG. 5 in assembled form.

It is, however, difficult to design a polygonal jig that will reduce in size, and yet maintain its shape, and this problem is illustrated at (a) in FIG. 1 of the accompanying drawings for the hexagonal case (the six compression slides S have a length sufficient to contain the whole uncompressed fibre pack but cannot move inwards to compress the pack).

The use of rams shorter than the sides of the initial pack would overcome the problem of adjacent corners fouling one another, but the corners of the pack would be completely uncontrolled.

Figure 1B:
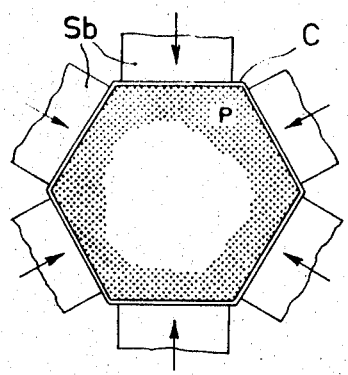
Figure 1C:
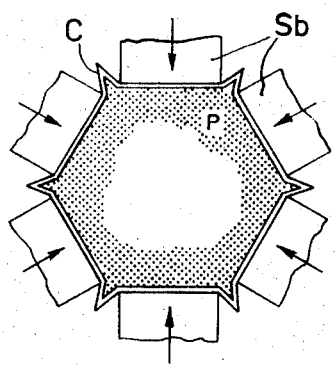

In principle, a solution to the problem could be to have a thin metal hexagonal cage C surrounding the fibre pack, and shorter compression slides Sb (FIG. 1b). However, with this arrangement, distortion would be concentrated sharply in the corners of the fibre pack (FIG. 1c). Although this in itself might not matter (the corners being outside the final circular channel plate area), there would be the risk of fault lines extending inwardly towards the centre of the plate. There is also the risk that glass trapped in the corners may impose high frictional losses during the fusion.

According to one aspect the present invention provides a method of manufacturing plates composed of parallel fibres according to which method fibres are arranged parallel to each other in a pack of polygonal form and pressure is then applied simultaneously to all sides of the polygonal pack by mechanical means with compression and heat sufficient to compact and seal together the individual fibres, the said pressure being applied initially to the central area of each side of the pack and the applied pressure being extended progressively towards the ends of the sides, i.e., towards the corners of the pack, so that the final compressed pack has curved concave sides of a length equal or approximately equal to one side of the uncompressed pack.

According to another aspect, the invention provides apparatus for carrying out the above method comprising a number of compression slides equal to the number of sides of the polygonal pack which slides are arranged with radial symmetry round a polygonal compression space provided for receiving said pack, driving means for applying to said slides simultaneous inward relative motion in radial directions so as to compress said pack, and means for heating the pack during such compression so as to fuse the fibres together, the operative compression faces of the slides co-operating with a cage which surrounds the pack so that the slides apply pressure initially to the central area of each side of the pack and extend the applied pressure progressively towards the ends of the sides of the pack, i.e., towards its corners, with the aid of the cage which is sufficiently stiff to compress the pack on either side of the instantaneous contact area of each slide, the arrangement being such that the final compressed pack has curved concave sides of a length equal or approximately equal to one side of the uncompressed pack.

The method used permits the apparatus to reduce in area (i.e., compress) the pack substantially without changing the length of its sides (in fact the sides of the pack may even lengthen slightly during the process). What happens is illustrated schematically at (a) in FIG. 2 and in FIG. 3 of the accompanying drawings which show how the corners of the pack P are sharpened and thus counteract the shortening of the sides of the pack which would otherwise take place. In other words, the pack changes from a regular straight-sided polygon to a curved-sided polygon of smaller area but having curved sides approximately as long as its original straight sides. This mode of operation is designed to ensure as far as possible that a circular plate (or one having a larger number of sides) obtained from the polygonal pack will have the minimum amount of distortion. In fact the parts of the pack near the middle of each compression slide 2 (FIG. 3) will be compressed substantially radially with little or no lateral movement and, if the fibre pack is initially regular, it will remain substantially regular in such central regions which will be included in the final plate. Conversely, parts X of the pack which lie near the corners will be subjected to most of the distortion and lateral displacement, but these distorted parts can largely be masked off or removed when the plate is cut to its final shape so as to leave a plate of substantially circular form (e.g., cutting line L of FIG. 3c) or of a polygonal form having a greater number of sides than the original pack.

The curvature of the compression faces can be distributed along the whole length of the faces (e.g., as in FIG. 2a and FIG. 3) and the radius of curvature may, if desired, be constant so that each face is cylindrical.

Figure 2A:
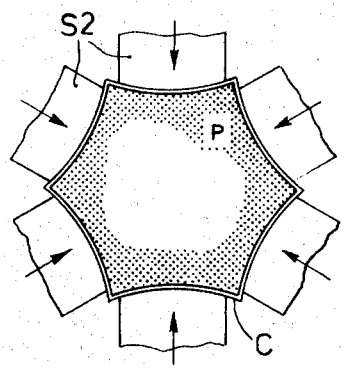
Figure 2B:
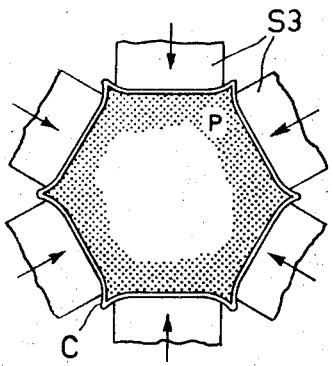

Alternatively, the curvature of each face may be concentrated near the corner regions e.g., as shown in FIG. 2b with a straight middle portion extending between the two curved portions of the face.

Figure 3B:
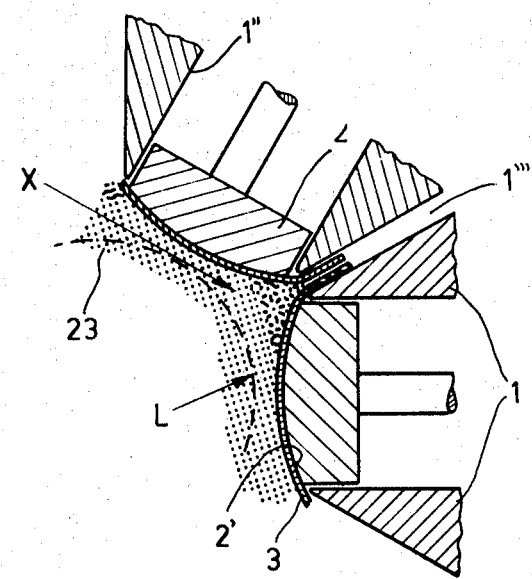

A metal or like deformable cage is shown in FIGS. 2a, 2b and 3 and is provided to contain and control the fibres that lie at the corners of the pack in the gaps between adjacent compression slides. Such a cage may be provided with the pack as the pack is loaded into the machine and it may, if desired, be composed of separate cheek plates as in FIG. 3 which illustrates the example given below. In any case the cage must be sufficiently stiff to compress the pack on either side of the instantaneous contact area of each slide and this is shown more clearly in FIG. 3 of the accompanying drawings. At (a) the fully curved slides 2 make initial contact with the cheek plate 3 at central points. As the slides 2 move radially inwards, the contact area between a slide and its cheek plate widens gradually until (as shown at (b) the whole slide is in contact with the cheek plate. At intermediate stages the cheek plates must be stiff enough to compress the pack at areas A 3a) 3a) where they are not yet backed by the slides.

1. DETAILED EXAMPLE

A specific embodiment of the invention will now be described by way of example with reference to FIGS. 3 to 7 of accompanying drawings as applied to a hexagonal pack used to obtain a circular channel plate of large diameter, for example a diameter of 124 mm.

2. THE FUSING MACHINE 2.1 General Description

As shown in FIG. 6, the fusing machine comprises a furnace F and temperature controller T, a compression jig indicated generally at J and associated hydraulic equipment, and a fibre loading jig.

The furnace F is mounted on a gantry G, and can be raised and lowered by means of a winch W. The compression jig is mounted on three supports inside the furnace base Fb (FIGS. 6 and 4), and the hydraulic assembly passes out through a hole in said base of the furnace (FIG. 4).

2.2 The Compression Jig

Six compression slides 2 are used (FIGS. 3 and 4) and their operative pressure faces are curved in accordance with FIG. 2a although they can alternatively be curved in accordance with FIG. 2b.

The compression jig body 1 (FIG. 4) is made from a large "telcoseal" casting, this material being chosen to match the expansion of the glass. The top is machined so as to house the hexagonal fibre pack 23. Six channels that guide the compression slides 2 radiate from the sides of the hexagon, and slots that locate the metal cheek plates 3 (see also FIG. 5) radiate from the corners of the hexagon. Said channels and slots are defined by guide portions of the jig body 1 which are indicated at 1 in FIG. 3.

Six bell crank levers 4 engage under the collar 5 of a hydraulic assembly and convert the downward movement of a hydraulic jack 6 through 90° into radial movement of the compression slides. Each of the bell cranks fits in a slotted web on the underside of the jig body, and is pivoted on an adjustable fulcrum pin 7 that passes through the web. (Positional adjustment of the pin can be provided for by mounting the pin on an eccentric).

The hydraulic assembly is suspended from the bell cranks by the collar 5 and the push rod 9 located in a central recess 10 in the underside of the compression jig.

The hydraulic jack or slave cylinder 6 is fixed inside the base of the ram tube 8. It is protected from conducted furnace heat by means of cooling water that is circulated at 11 – 12 between the lower end of the push rod and ram tube above a water seal 13.

When hydraulic pressure is applied by means of pump 14 (see also FIG. 6), the jack forces the push rod up against the underside of the jig, and the ram tube pulls down against the bell cranks, causing the six compression slides to move radially inwards against the cheek plates thus bending them inwards against the sides of the pack.

A pneumatic pressure reservoir 15 allows an almost constant hydraulic pressure to be maintained during fusion.

The maximum indicated hydraulic pressure available can, in a practical example, be 1,720N/cm² (2,500 lb/in²) corresponding to about 138N/cm² (200 lb/in²) on each cheek plate.

With the pressure release valve open, the hydraulic assembly can be raised manually by means of a lever 16 mounted at the base. This frees the compression slides, allowing free access to the fibre housing and cheek plates. The lever is also used to monitor the ram movement during compression and a rule 17 is mounted alongside the lever for this purpose.

Asbestos paper can be used to stop the glass adhering to the jig and, as an added precaution, stainless steel plates can be used to line the top and bottom of the pack.

The expansion coefficient of the "Telcoseal" used in this example (Telcoseal 1) is less than $5 \times 10^{-6}$/deg.C, whilst that of the glass is more than $1 \times 10^{-5}$/deg.C. Consequently, as the fused bundle cools down, it contracts away from the compression jig and can therefore be easily removed.

2.3 The Loading Jig

The problems of packing the multifibre directly into the compression jig are:

a. It is not possible to use back lighting during the packing operation (back lighting is of great assistance as it enables the fibres to be correctly positioned more easily).

b. The compression jig is rather cumbersome to handle (because it is difficult to pack the fibres vertically) and is in a dirty situation, so in situ packing is undesirable.

These problems have been overcome by packing the fibre into a loading jig in a clean area, and then transferring the whole pack into the compression jig.

The loading jig body consists of a plate 20 (e.g., of aluminum) with a hexagonal hole and 6 radial slots machined in it (FIG. 5). Plates 21–22 (e.g., of "Perspex") fit on either face of the jig body, and the fibre pack 23 is sandwiched between base plate 22 and a plate 25 (e.g., of stainless steel) by means of studs 26. These studs pass through the fibre packing space and the fibres are packed around them. They may be six studs (as indicated) or less, two studs being sufficient in some cases.

The hexagonal finned block 24 shown at the bottom of the drawing does not form part of the jig at this stage and has only been shown in this figure in order to explain how it corresponds dimensionally with the hole and slots in the jig body 20.

FIG. 7 illustrates the further steps in the loading procedure. FIG. 7a shows the loading jig of FIG. 5 in its assembled form with fibres packed inside it against the cheek plates 3 and a lining 30 of asbestos paper or the like. The studs 26 are screwed into the plate 25.

Figure 7B:
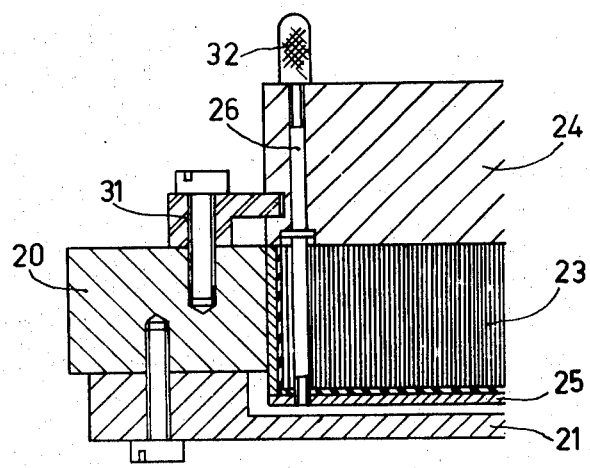
Figure 7C:
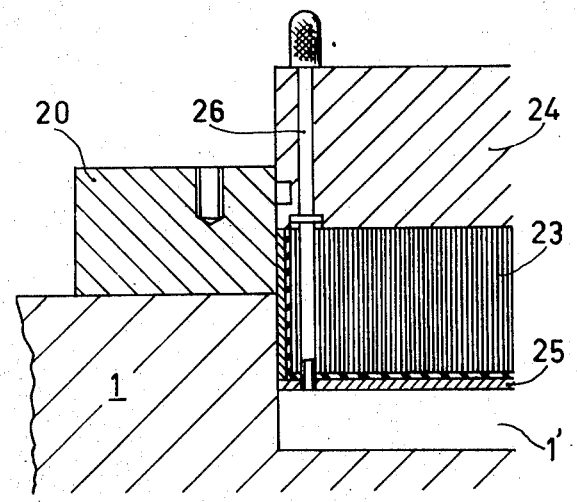

In FIG. 7b this jig has been inverted and the plate 22 has been replaced by the finned block 24 mentioned above, said block being made e.g., of aluminium. This block is now secured by catches 31 and knurled nuts 32 on the studs. Studs 26 are slotted or keyed into block 24 so as to prevent rotation.

The aluminium block 24 is used in the next phase (FIG. 7c) to push the completed fibre pack into the compression jig. This phase is facilitated by the fact that the fibre pack protrudes from the jig body, thus allowing the pack to be easily located in the top of the compression jig 1. The hexagonal hole in the jig body 20 is slightly smaller than the hexagonal housing in the compression jig 1, thus offering some clearance between pack and housing during the loading operation.

In the next phase (not shown in the drawings) the studs 26 are removed and the voids thereby left in the fibre pack are filled with additional fibres to complete the pack as uniformly as possible prior to heating and fusing. The latter operation is then carried out with inward pressure applied to the pack by all six compression slides 2 driven by the hydraulic ram system 6–8–9 as previously described.

Although the above machine has been described as using six compression slides having faces with constant or substantially constant curvature in accordance with FIG. 2a, the same machine can use alternatively slides in accordance with FIG. 2b where the curvature of the faces is concentrated near the corners.

Moreover, a similar machine could use four slides instead of six provided appropriate fibre cross-sections and fibre packing methods are adopted. Again, each of the four slides can be profiled in accordance with FIG. 2a or FIG. 2b. As for the shape of the final plate, the 4 distorted corner areas can be cut off so as to leave an octagonal plate having four main (longer) sides and four minor (corner) sides which are shorter than the main sides.

What we claim is:

1. Apparatus for manufacturing plates composed of parallel fibers comprising a number of compression slides equal to the number of sides of a polygonal pack of fibers, said slides being arranged with radial symmetry around a polygonal compression space provided for receiving said pack, driving means for applying to said slides simultaneous inward relative motion in radial directions so as to compress said pack, means for heating the pack during said compression so as to fuse the fibers together, and a cage surrounding the pack and cooperating with the operative faces of the slides whereby the slides apply pressure initially to the central area of each side of the pack and extend the applied pressure progressively towards the ends of the sides of the pack thereby forming curved concave sides of a length approximately equal to one side of the uncompressed pack.

2. Apparatus as claimed in claim 1 wherein the operative faces of the slides are convex and curved.

3. Apparatus as claimed in claim 1 wherein the cage is composed of separate cheek plates one of which is located against each side of the pack.

4. Apparatus as claimed in claim 1 wherein the compression slides are driven by bell crank levers actuated by a common fluid pressure actuator.

5. Apparatus as claimed in claim 1 in combination with a loading jig for packing the fibres and for transfer to the compression space of the apparatus.

* * * * *